(12) United States Patent
Zweighaft (10) Patent No.: US 6,450,431 B1
(45) Date of Patent: *Sep. 17, 2002

(54) METHOD FOR PREVENTING A REVERSE CONNECTION FAILURE IN A SINGLE REEL TAPE DRIVE

(75) Inventor: James Zweighaft, Boulder, CO (US)

(73) Assignee: Benchmark Storage Innovations, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,150

(22) Filed: Apr. 4, 2000

(51) Int. Cl.⁷ .................................................. G03B 1/58
(52) U.S. Cl. ............................. 242/332.1; 242/333.7; 242/357
(58) Field of Search ........................... 242/332.1, 332.2, 242/332.4, 348.2, 336, 338, 357, 333.7, 333.6, 334.2; 360/132, 95, 96

(56) References Cited

U.S. PATENT DOCUMENTS

| | | | |
|---|---|---|---|
| 3,473,042 A | * | 10/1969 | Orlando |
| 3,764,088 A | * | 10/1973 | Yamada et al. |
| 3,880,382 A | * | 4/1975 | Jantzen et al. |
| 4,502,607 A | | 3/1985 | Szaina |
| 4,502,647 A | * | 3/1985 | Zweighaft et al. |
| 4,572,460 A | | 2/1986 | Hertrich |
| 4,662,049 A | | 5/1987 | Hertrich |
| 4,679,747 A | | 7/1987 | Smith |
| 4,977,474 A | | 12/1990 | Oishi et al. |
| 5,325,249 A | * | 6/1994 | Butts et al. ................... 360/95 |
| 5,379,167 A | | 1/1995 | Robles et al. |
| 5,557,484 A | * | 9/1996 | Leonhardt et al. ............ 360/95 |
| 5,769,346 A | | 6/1998 | Daly |
| 5,793,563 A | | 8/1998 | Katsuyama et al. |
| 5,971,310 A | | 10/1999 | Saliba et al. |
| 6,186,430 B1 | * | 2/2001 | Zweighaft ................ 242/332.4 |

* cited by examiner

Primary Examiner—William A. Rivera
(74) Attorney, Agent, or Firm—Patton Boggs LLP (57) ABSTRACT

A method for preventing a reverse connection between a takeup leader connected to a single reel tape drive and a tape cartridge leader connected to a magnetic tape media contained in a single reel tape cartridge that is loadable into the tape drive. The method comprises detecting a missed connection between the takeup leader and the tape cartridge leader following a failed load operation. The load operation includes loading the tape cartridge into the tape drive, connecting the takeup leader and tape cartridge leader, and winding the tape media to the read position. In response to detecting the missed connection, a torque is applied to the takeup leader to retain it in a loaded position away from the tape cartridge leader while the tape cartridge is ejected from the tape drive. In response to ejecting the tape cartridge from the tape drive, the takeup leader is reset to the unloaded position for a subsequent loading operation.

6 Claims, 7 Drawing Sheets

METHOD FOR PREVENTING A REVERSE CONNECTION FAILURE IN A SINGLE REEL TAPE DRIVE

FIELD OF THE INVENTION

The invention relates to digital tape drive storage devices, and in particular, to a method for preventing a reverse connection between a takeup leader and a tape cartridge leader in a single reel tape drive.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within a removable tape cartridge and a takeup reel located within the tape drive.

Figure 1:
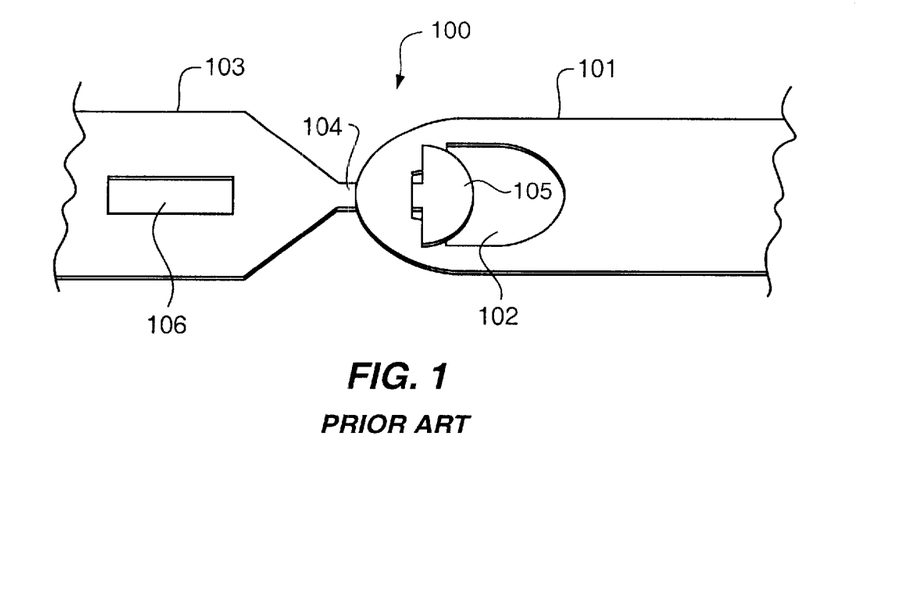
FIG. 1 illustrates an example of a buckle connection.

After the tape cartridge is inserted into the tape drive, the tape media must be loaded into the tape drive. The loading operation includes connecting the tape media to the takeup reel and winding the tape media to a start point or read position. Various methods have been employed to make this connection. FIG. 1 illustrates one such method wherein the tape media connects to the takeup reel via a buckle 100 between a tape cartridge leader 101 and a takeup leader 103. In this configuration, the tape cartridge leader 101 terminates the tape media at one end. The tape cartridge leader 101 is a strong flexible plastic strip containing an ovular aperture 102 configured to mate with the takeup leader 103. The takeup leader 103 is a similar strong flexible plastic strip attached at one end to the takeup reel. The opposing end includes a stem 104 and a tab 105 designed to buckle with the ovular aperture 102 on the tape cartridge leader 101. After the takeup leader 103 and the tape cartridge leader 101 are buckled, they are wound through a tape path past the tape head until the beginning of the tape media is in the read position relative to the tape head. Similarly, an unloading operation includes unwinding the takeup leader 103 and tape cartridge leader 101 back past the tape head and unbuckling the leaders so that the tape cartridge may be ejected from the tape drive.

Unfortunately, connection failures that cause the tape drive to malfunction can occur during the loading of the tape cartridge. Connection failures occur in different forms. One form of connection failure is a complete miss between the takeup leader 103 and the tape cartridge leader 101. When a complete miss failure occurs, the takeup leader 103 is pulled into the tape drive by the takeup reel during winding and cannot be pushed back into position for loading of subsequent tape cartridges. The tape drive is rendered inoperable and must be removed from its' enclosure for service. This problem is particularly acute in library applications, where the insertion of a tape cartridge with a broken tape cartridge leader into successive tape drives may render the drives useless until the entire system is brought down. In addition, because the takeup leader 103 tends to wear out with use, the problem is most common in high duty cycle applications where it potentially does the most damage.

One solution to the problem of a missed connection rendering a tape drive inoperable is described in U.S. patent application 09/293,585. U.S. patent application 09/293,585 describes a sensing assembly that performs a buckle integrity test to detect missed connections. If a missed connection is detected the takeup leader 103 is automatically reset to the unloaded position and the tape cartridge is ejected. The sensing assembly comprises a microprocessor and at least one position sensor that detects movements in the tape drive consistent with either a proper connection or missed connection.

Figure 2:
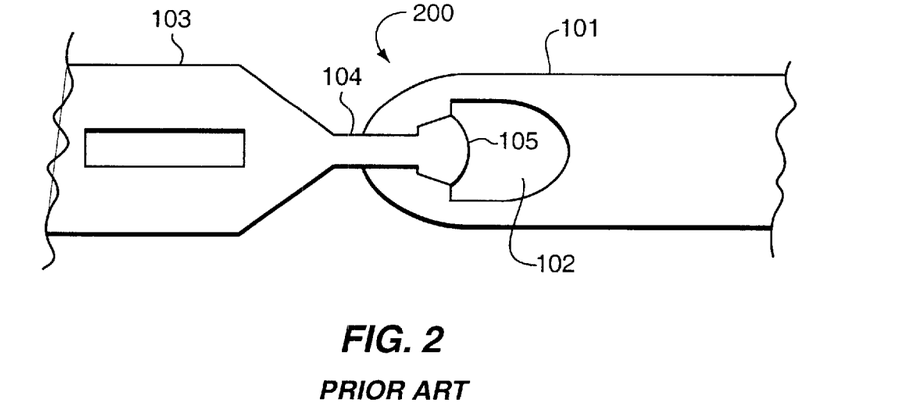
FIG. 2 illustrates an example of a reverse buckle connection.

It is a problem following a missed connection to reset the takeup leader 103 to the unloaded position before the tape cartridge is ejected. The target area for the unloaded position is relatively small and the exact position of the stem 104 and tab 105 varies depending on factors such as wear and tape drive tolerances. One specific problem occurring during the reset operation is illustrated by FIG. 2 and is known in the art as a "reverse buckle." During a reverse buckle situation, the stem 104 and tab 105 of the takeup leader 103 are returned to the front side of the aperture 102 in the tape cartridge leader 101 and form a reverse buckle 200 with the tape cartridge leader 101. The reverse buckle 200 will not detach when the tape cartridge is ejected from the tape drive causing the tape cartridge to become stuck in the tape drive. If a user forces the tape cartridge out of the tape drive, the tape media and/or the tape drive can be damaged. As with the missed connection where the takeup leader 103 is drawn into the tape drive, the tape drive is rendered inoperable and must be removed from its' enclosure for service.

Unfortunately, the problem of resetting the takeup leader 103 before ejecting the tape cartridge is not easily solved without redesigning the entire tape drive. The takeup leader reset operation is mechanically tied to the tape cartridge eject operation so that the tape cartridge cannot be ejected unless the reset operation is completed. Therefore, a need exists in the art for a simple low cost method of ejecting the tape cartridge prior to resetting the takeup leader.

SOLUTION

The present invention overcomes the problems outlined above and advances the art by providing an inexpensive method for ejecting the tape cartridge from the tape drive prior to resetting the takeup leader to the unloaded position. A first advantage of the present invention is that the method prevents the possibility of a reverse connection failure by ejecting the tape cartridge before resetting the takeup leader to the unloaded position. A second advantage of the present invention is that the method provides a low cost solution without redesigning the tape drive.

The method comprises detecting a missed connection between the takeup leader and the tape cartridge leader following a failed load operation. The load operation includes loading the tape cartridge into the tape drive, connecting the takeup leader and tape cartridge leader, and winding the tape media to the read position. In response to detecting the missed connection, a torque is applied to the takeup leader to retain it in a loaded position away from the tape cartridge leader while the tape cartridge is ejected from the tape drive. In response to ejecting the tape cartridge from the tape drive, the takeup leader is reset to the unloaded position for a subsequent loading operation.

DETAILED DESCRIPTION

Prior Art Reset Operation FIGS. 3–6

Figure 3:
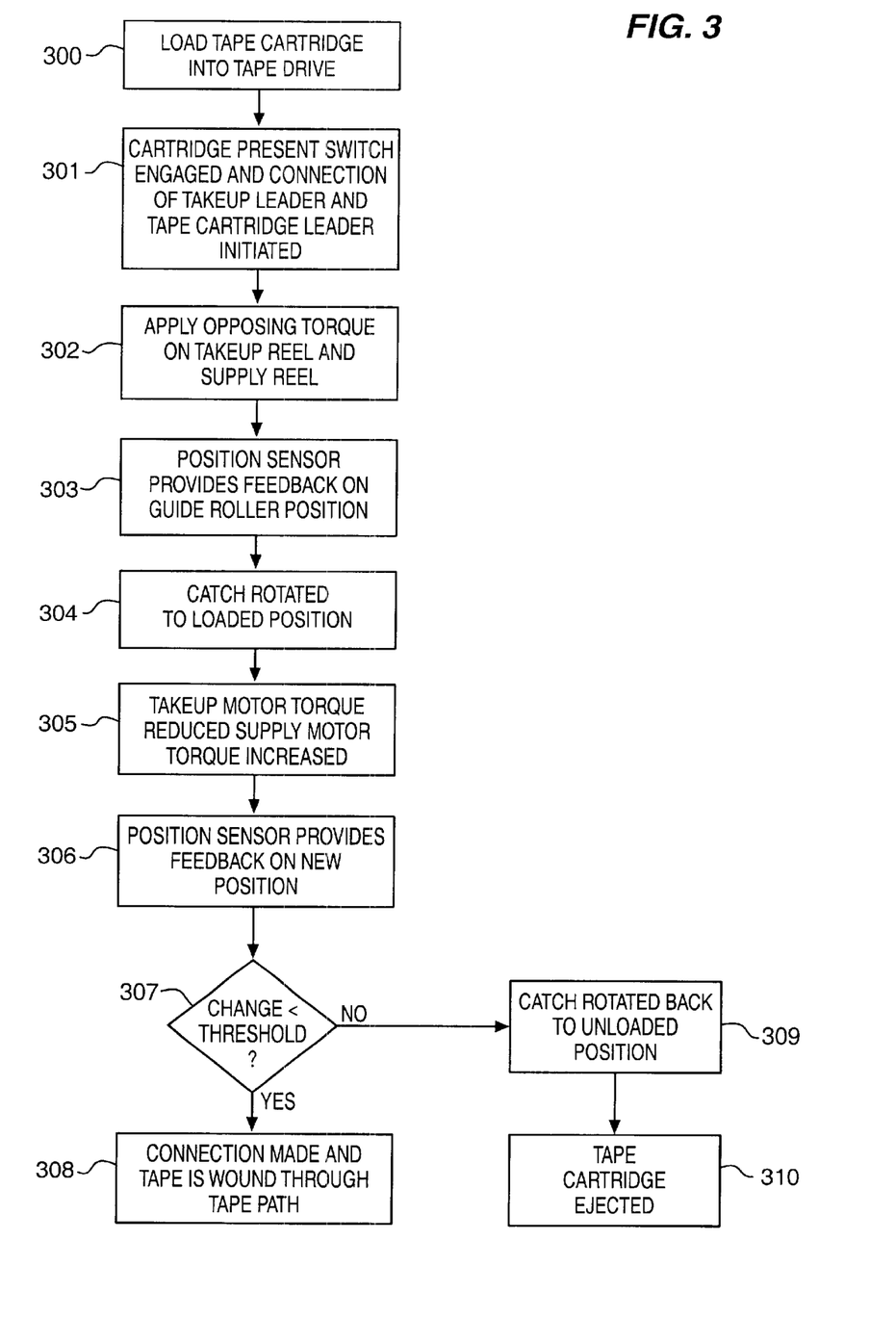
FIG. 3 is a flow chart illustrating the prior art load operation and reset operation following a missed connection.
Figure 4:
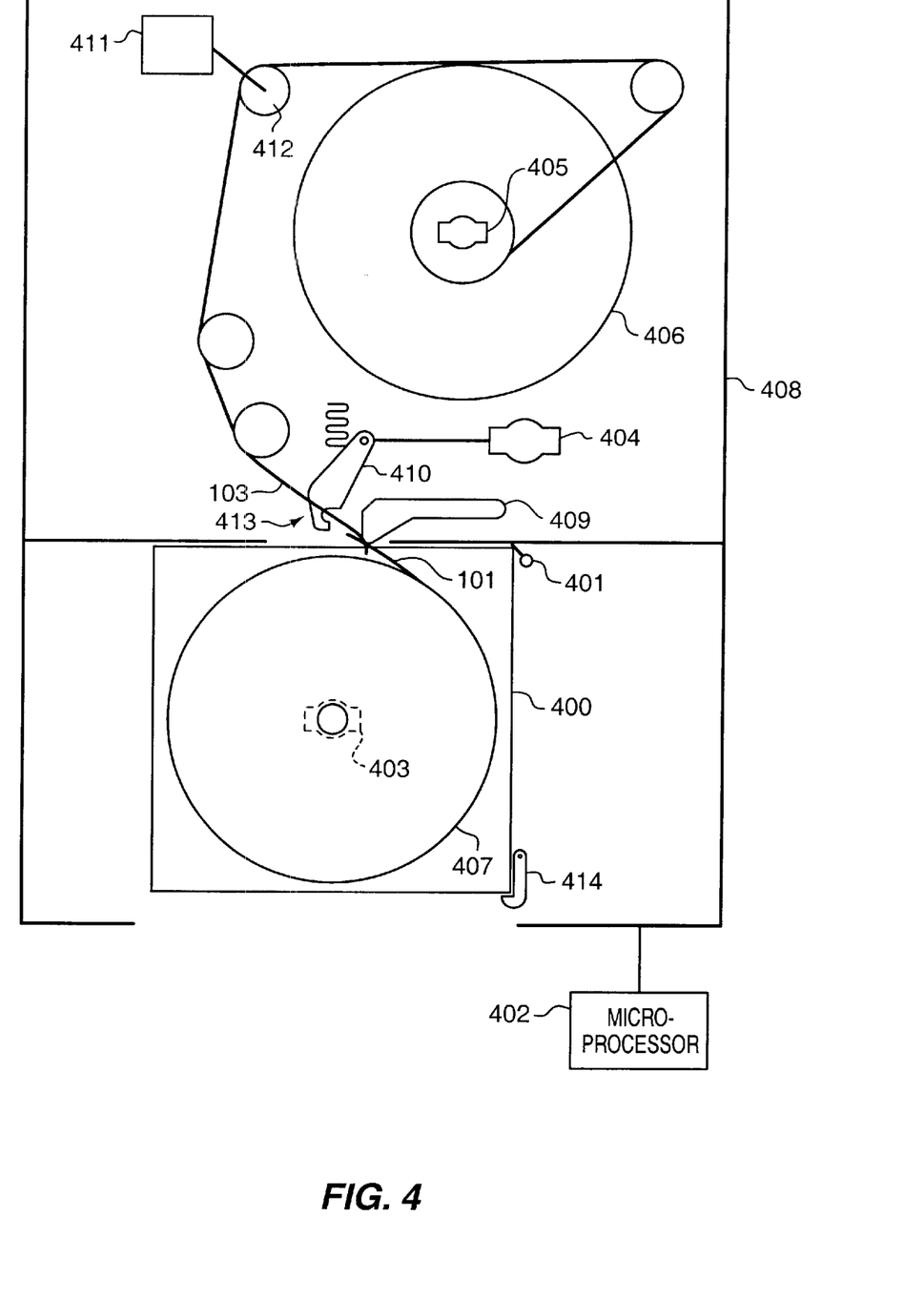
FIG. 4 illustrates an example of a tape drive that could employ the method of the present invention.

FIG. 3 is a flow diagram illustrating the prior art load and reset operation. Referring to FIGS. 1, 3, 4, and 5 the tape load operation begins when a tape cartridge 400 is loaded into a tape drive 408 at step 300. When the tape cartridge 400 is fully inserted into the tape drive 408, the tape cartridge leader 101 is positioned to connect with the takeup leader 103. A positioning lever 409 positions the tape cartridge leader 101 and the takeup leader 103 for connection. In the unloaded position 413, a catch 410 is hooked through an aperture 106 in the takeup leader 103 and the positioning lever 409 holds the takeup leader 103 so that the stem 104 and tab 105 are inserted through the backside of aperture 102. The loading of the tape cartridge 400 engages a cartridge present switch 401, which initiates the connection of the tape cartridge leader 101 and takeup leader 103 at step 301. A microprocessor 402 in response to a signal from the cartridge present switch 401, energizes a takeup motor 405 and a supply motor 403 to apply opposing torque on a takeup reel 406 and a supply reel 407 at step 302. The opposing torque biases the takeup leader 103 and the tape cartridge leader 101 to make the connection. It should be noted that the takeup leader 103 is sufficiently biased on the catch 410 by energizing the takeup motor 405 significantly more than the supply motor 403 at step 302. This prevents the takeup leader 103 from releasing from the catch 410 unless the supply motor 403 and the supply reel 407 pull it off in a subsequent step.

Figure 5:
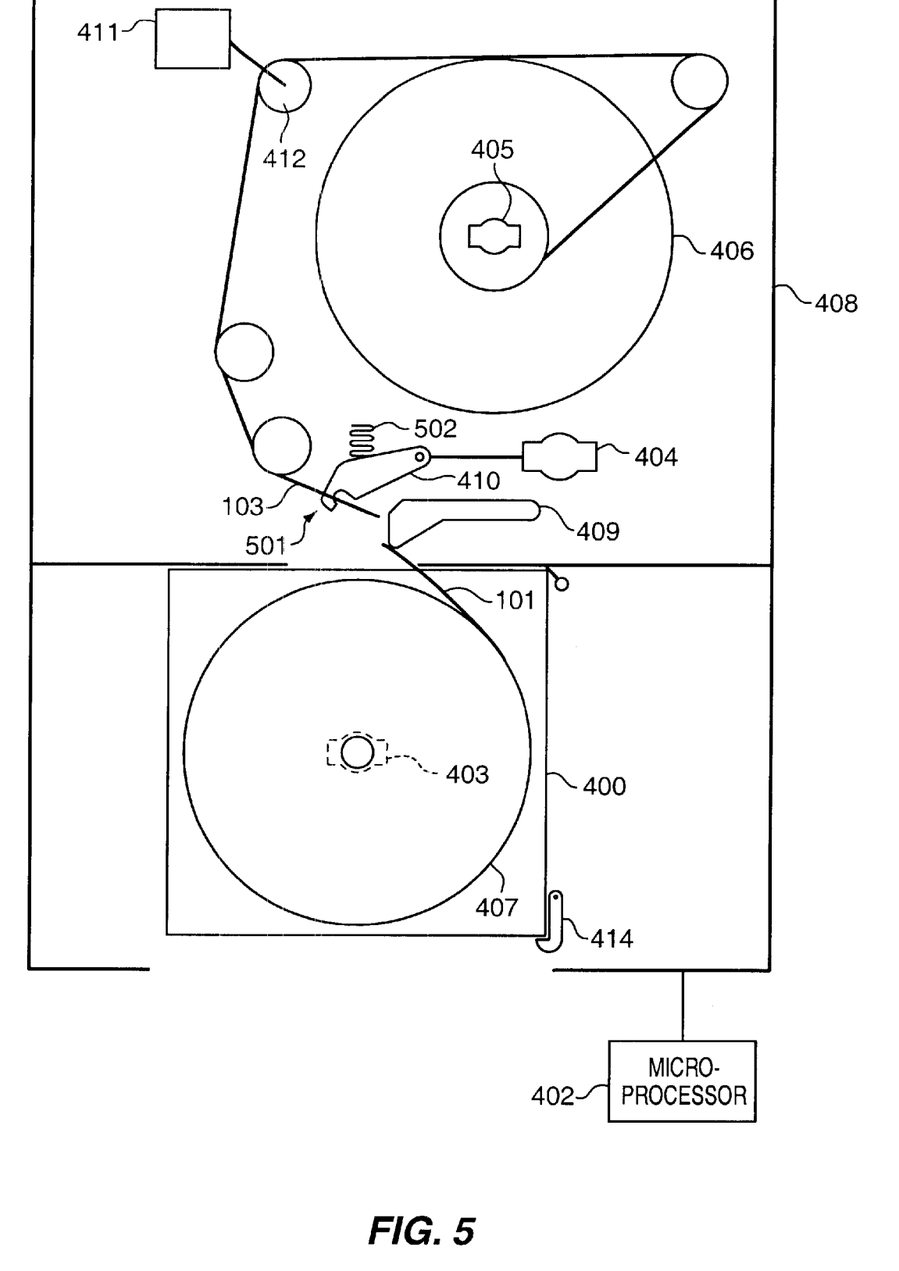
FIG. 5 illustrates an example of a missed connection in a tape drive.

A position sensor 411 provides feedback to the microprocessor 402 on the angular position of guide roller 412, which is freely driven by the takeup leader 103 at step 303. Responsive to making the connection, a load motor 404 is energized to rotate the catch 410 to the loaded position 501 at step 304. Once in the loaded position 501, the torque on the takeup motor 405 is reduced while the torque on the supply motor 403 is increased at step 305. If a proper connection was made the increased torque on the supply motor 403 and the decreased torque on the takeup motor 405 cause the tape cartridge leader 101 to pull the takeup leader 103 off of the catch 410. If the connection is missed, the takeup leader 103 remains biased on the catch 410 as illustrated by FIG. 5.

At step 306, the position sensor 411 provides feedback to the microprocessor 402 on the new angular position of the guide roller 412. The connection status of the takeup leader 103 and the tape cartridge leader 101 is determined by the change in position of the guide roller 412. If the connection is made, the change in position is small because the takeup leader 103 moves the guide roller 412 back toward its original position when the takeup leader 103 is pulled off of the catch 410 by the tape cartridge leader 101. If the connection is missed, the change in position is larger because the guide roller 412 remains in the rotated condition of FIG. 5.

The microprocessor 402 compares the change in angular position of the guide roller 412 with a threshold to determine if the connection was made at step 307. If the change in position is smaller than the threshold, indicating a proper connection, loading is complete and the magnetic tape is wound through the tape path as data is transferred to or from the magnetic tape at step 308. If the change in position is greater than the threshold, indicating a failed connection, the microprocessor 402 energizes the load motor 404 to release tension on the catch 410 and rotate it back to the unloaded position 413 at step 309. It should be noted that at step 309, the torque on the takeup reel 406 applied by the takeup motor 405 is small enough to allow the spring 502 to rotate the takeup leader 103 back to the unloaded position 413 with the catch 410. Responsive to the completion of the load motor 404 operation, the cartridge release lever 414 is triggered and the tape cartridge 400 is ejected at step 310.

Figure 6:
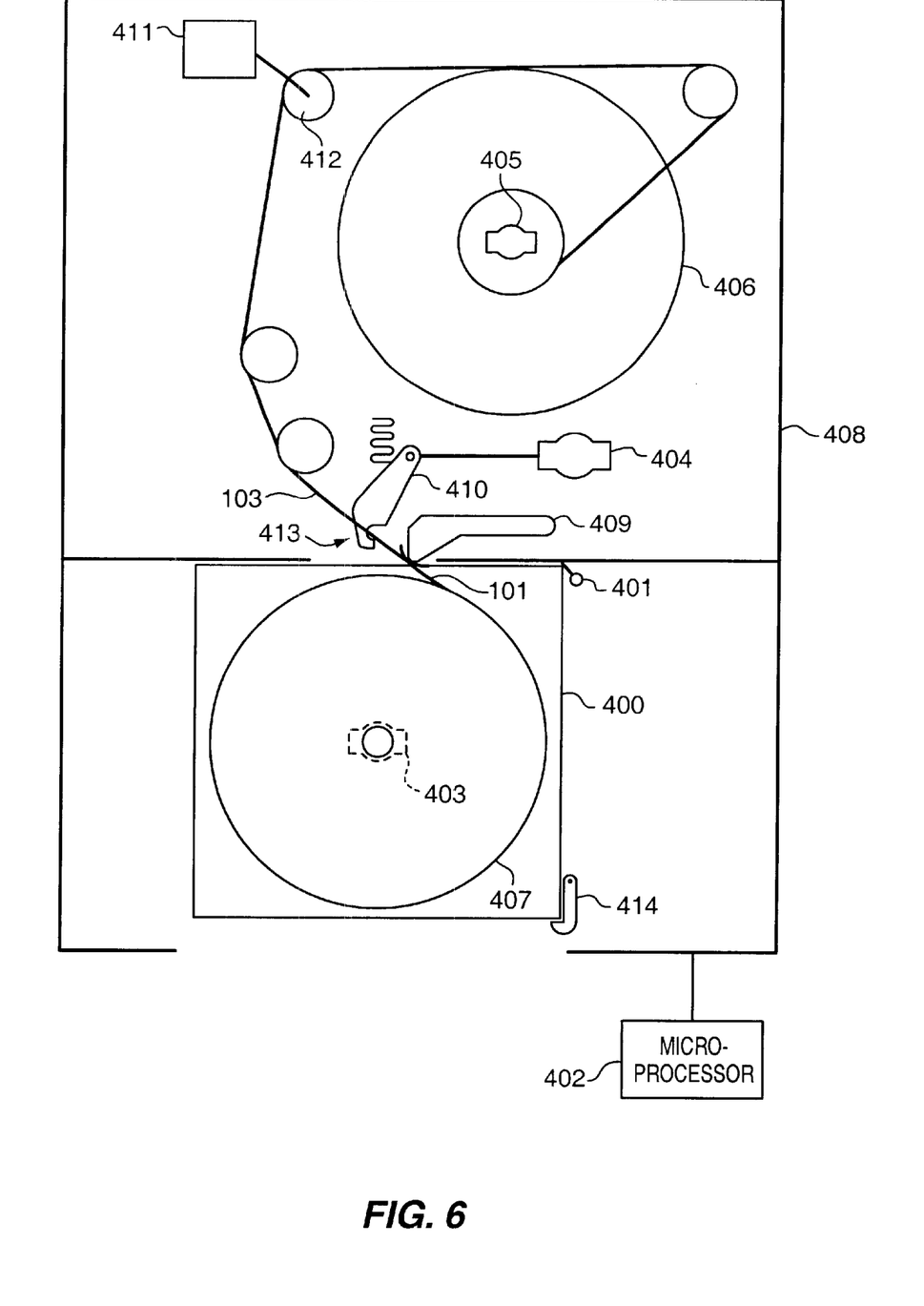
FIG. 6 illustrates a reverse connection in a tape drive.

FIG. 6 illustrates a failed reset operation in the tape drive 408. FIG. 6 depicts the takeup leader 103 reset to the unloaded position 413 with the stem 104 and the tab 105 inserted through the front side of the aperture 102 of the tape cartridge leader 103. In this case the ejection of the tape cartridge 400 will form the reverse connection 200 causing the tape cartridge 400 to become stuck in the tape drive 408. Advantageously, the present invention prevents the possibility of the reverse connection 200 between the takeup leader 103 and the tape cartridge leader 101.

Figure 7:
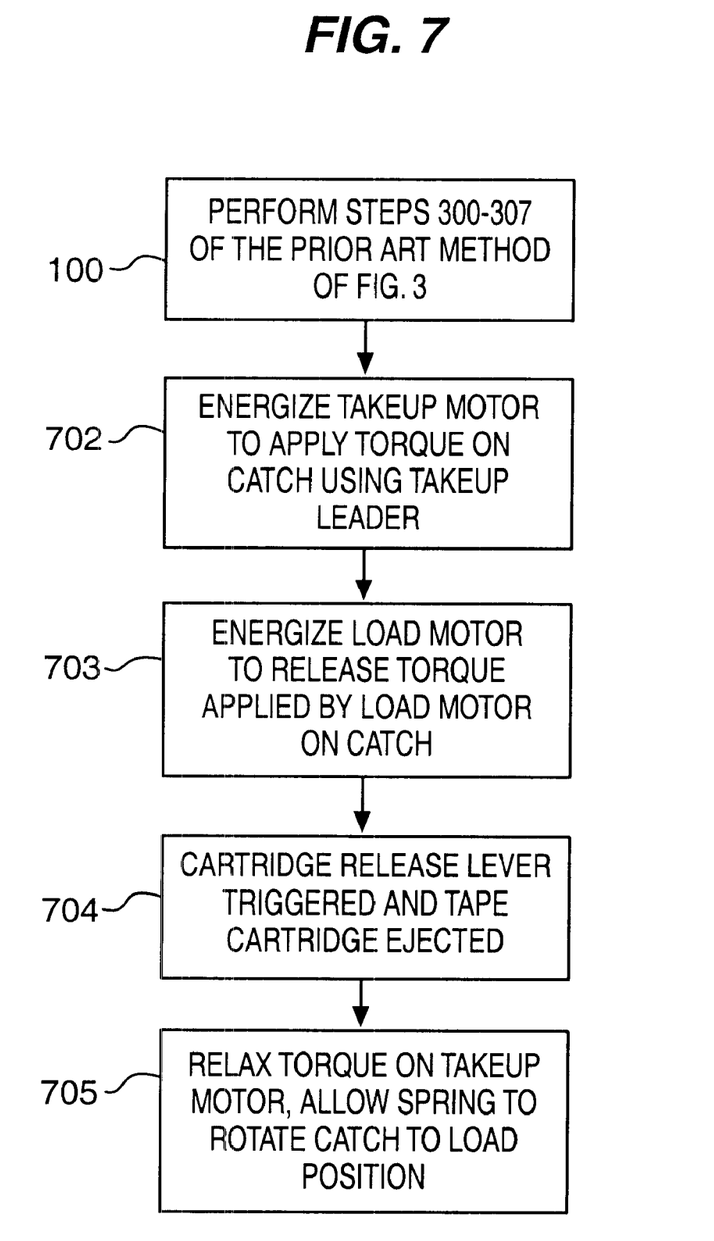
FIG. 7 is a flow chart illustrating the operation of a tape drive configured to operate in accordance with the method of the present invention.

Method of Preventing a Reverse Connection FIG. 7

Figure 8:
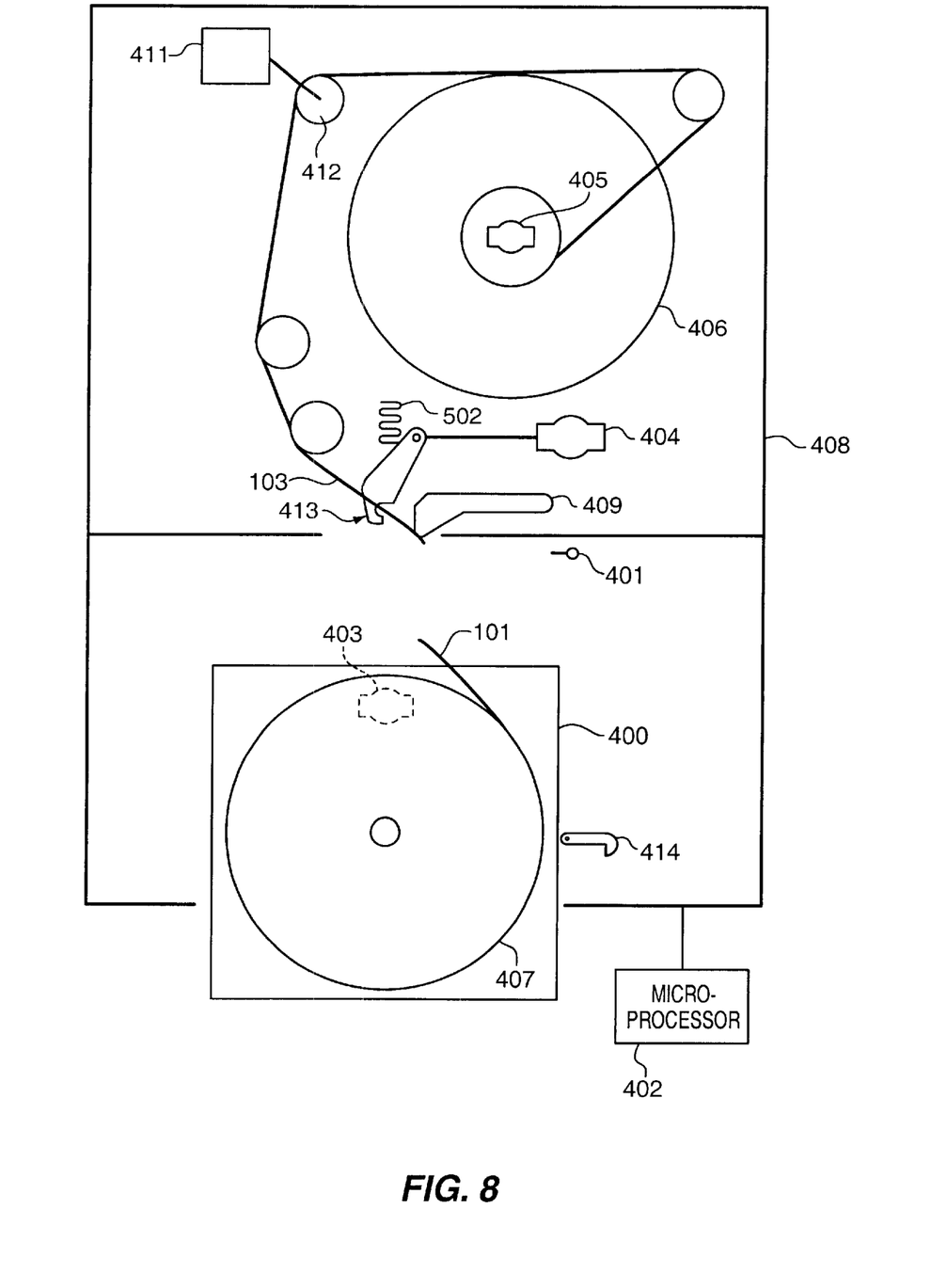
FIG. 8 illustrates an example of a tape drive after the tape cartridge is ejected from the tape drive.

FIG. 7 is a flow chart illustrating the operation of the tape drive 408 configured to operate in accordance with the method of the present invention. On FIG. 7 the steps 300–307 of the prior art method of loading and detecting the missed connection are performed at step 700. Referring to FIG. 5, responsive to the detection of a missed connection at step 307 of the prior art method, the microprocessor 402 energizes the takeup motor 405 to apply a clockwise torque on catch 410 using the takeup leader 103 at step 701. The amount of torque could vary as a matter of design choice and tape drive model so long as the torque is sufficient to retain the catch 410 in the loaded position 501. It should be noted that at this point both the takeup leader 103 and the load motor 404 are applying a clockwise torque on the catch 410 to retain it in the loaded position 501. After energizing the takeup motor 405, the microprocessor 402 energizes the load motor 404 to release the torque on the catch 410 applied by the load motor 404 at step 703. The catch 410 is now retained in the loaded position 501 only by the pressure on the takeup leader 103 applied by the takeup motor 405. Referring to FIG. 8, the completion of the load motor 404 operation triggers the cartridge release lever 414, and ejects the tape cartridge 200 at step 704. At step 705 the microprocessor 402 relaxes the torque applied by the takeup motor 405 and takeup leader 103 allowing the spring 502 to rotate the catch 410 back to the unloaded position 413 as illustrated by FIG. 8. Advantageously, the stem 104 and tab 105 of the takeup leader 103 are held safely away from the tape cartridge leader 101 during ejection of the tape cartridge 200.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for preventing a reverse connection failure between a takeup leader connected to a single reel tape drive and a tape cartridge leader connected to a magnetic tape media contained in a single reel tape cartridge that is loadable into the tape drive, the method comprising:

detecting a missed connection between the takeup leader and the tape cartridge leader;

responsive to detecting the missed connection, ejecting the tape cartridge from the tape drive; and responsive to ejecting the tape cartridge, resetting the takeup leader from a loaded position to an unloaded position.

2. The method of claim 1 wherein the step of detecting the missed connection comprises:

loading the tape cartridge into the tape drive;

moving the takeup leader from the unloaded position to the loaded position;

sensing movement of the takeup leader within a tape path; and using the sensed movement to determine if the takeup leader is connected to the tape cartridge leader.

3. The method of claim 2 wherein the step of loading the tape cartridge comprises:

engaging a cartridge present switch; and applying opposing torque on the takeup reel and a supply reel to connect the tape cartridge leader and the takeup leader.

4. The method of claim 2 wherein the step of ejecting the tape cartridge from the tape drive comprises:

operating a load motor to trigger a cartridge release lever that ejects the tape cartridge;

retaining the takeup leader in the loaded position during the operation of the load motor; and responsive to triggering the cartridge release lever, moving the takeup leader from the loaded position to the unloaded position.

5. The method of claim 4 wherein the step of retaining the takeup leader in the loaded position comprises:

applying a torque on the takeup leader to retain the take up leader and a catch in the loaded position against a spring.

6. The method of claim 5 wherein the step of moving the takeup leader from the loaded position to the unloaded position comprises:

releasing the torque on the takeup leader; and allowing the spring to rotate the catch and the takeup leader from the loaded position to the unloaded position.

* * * * *